United States Patent
Danne et al.

(10) Patent No.: US 9,436,456 B2
(45) Date of Patent: Sep. 6, 2016

(54) SYSTEM AND METHOD FOR MANAGEMENT OF SOFTWARE UPDATES AT A VEHICLE COMPUTING SYSTEM

(71) Applicant: MYINE ELECTRONICS, INC., Ferndale, MI (US)

(72) Inventors: Philip Joseph Danne, Royal Oak, MI (US); Joey Ray Grover, Madison Heights, MI (US); Scott Smereka, Warren, MI (US); Joel J. Fischer, Royal Oak, MI (US)

(73) Assignee: Myine Electronics, Inc., Ferndale, MI (US)

( * ) Notice: Subject to any disclaimer, the term of this patent is extended or adjusted under 35 U.S.C. 154(b) by 0 days.

(21) Appl. No.: 14/255,292

(22) Filed: Apr. 17, 2014

(65) Prior Publication Data

US 2015/0301821 A1 Oct. 22, 2015

(51) Int. Cl.
*G06F 9/445* (2006.01)
*H04L 29/08* (2006.01)

(52) U.S. Cl.
CPC .............. *G06F 8/665* (2013.01); *H04L 67/06* (2013.01)

(58) Field of Classification Search
CPC .............. G06F 8/65; G06F 8/68; G06F 8/61
USPC ....................................................... 717/169
See application file for complete search history.

(56) References Cited

U.S. PATENT DOCUMENTS

| | | | | |
|---|---|---|---|---|
| 8,032,878 B2 * | 10/2011 | Nakagaki | ............... | G11C 16/10 701/29.6 |
| 8,561,054 B2 * | 10/2013 | Smirnov | .................. | G06F 8/64 717/120 |
| 8,589,908 B2 | 11/2013 | Subbakrishna et al. | | |
| 9,094,436 B2 * | 7/2015 | Westra | .................. | H04L 67/141 |
| 2005/0216903 A1 * | 9/2005 | Schaefer | ............... | G07C 5/008 717/168 |
| 2010/0312418 A1 * | 12/2010 | Kraft | ..................... | G06F 13/409 701/1 |
| 2013/0159717 A1 * | 6/2013 | Rabadi et al. | ................ | 713/176 |
| 2013/0185563 A1 | 7/2013 | Djabarov et al. | | |
| 2013/0210525 A1 * | 8/2013 | Sizelove et al. | ................ | 463/37 |
| 2013/0268754 A1 * | 10/2013 | Baltes et al. | .................. | 713/156 |
| 2013/0275761 A1 | 10/2013 | Catsburg et al. | | |
| 2015/0169311 A1 * | 6/2015 | Dickerson | ................ | G06F 8/65 717/170 |
| 2015/0309784 A1 * | 10/2015 | Molin | ....................... | G06F 8/65 701/71 |

* cited by examiner

*Primary Examiner* — John Chavis
(74) *Attorney, Agent, or Firm* — Jennifer M. Stec; Brooks Kushman P.C.

(57) ABSTRACT

A vehicle software management system includes a transceiver configured to communicate information with a server, and a processor in communication with the transceiver. The processor may be configured to receive a file manifest from the server and transmit a list of to-be updated application file(s) based on the file manifest to the server. The processor may be further configured to receive one or more application files from the server based on the list. The processor may be further configured to flash one or more systems using the one or more application files based on at least one of destination file location, installation type, and file identification.

19 Claims, 5 Drawing Sheets

SYSTEM AND METHOD FOR MANAGEMENT OF SOFTWARE UPDATES AT A VEHICLE COMPUTING SYSTEM

TECHNICAL FIELD

The disclosure relates to a method and system for remotely upgrading one or more application files of a vehicle computing system.

BACKGROUND

U.S. Pat. No. 8,589,908 generally discloses a system and method for remotely upgrading the firmware of a target device using wireless technology from the Bluetooth-enabled PC or Laptop to another Bluetooth device e.g., mouse, keyboard, headset, mobile phone etc. Existing solutions either may not have upgrade capabilities, or may require the use of proprietary cables. An embodiment of the solution proposed here extends the "Connecting without cables" concept of Bluetooth to firmware upgrades. The system comprises a host device for sending the firmware required for upgradation; and a target device containing a first code and a second code wherein said first code identifies details of the firmware; and said second code identifies the completion of the download operation when the firmware is successfully downloaded U.S. Patent Publication 2013/0159717 generally discloses a method for authenticating a piece of firmware to be downloaded to a controller. The method includes signing the firmware or a first part of the firmware with a first private key at a first trusted source and signing the firmware or a second part of the firmware with a second private key at a second trusted source. The method also includes validating the signed firmware or the first part of the firmware using a first public key at the controller and validating the firmware or the second part of the firmware using a second public key at the controller. The method further includes authenticating the firmware if the firmware or the first part of the firmware is validated by the first public key at the controller and the firmware or the second part of the firmware is validated by the second public key at the controller.

U.S. Patent Publication 2013/185563 generally discloses a mobile device performing an over-the-air (herein known as OTA) firmware update by writing the updated firmware to a inactive system image partition, and rebooting the device. The security of the OTA update is maintained through checking a plurality of security signatures in an OTA manifest, and the integrity of the data is maintained by checking a hash value of the downloaded system image

SUMMARY

In at least one embodiment, a vehicle software management system having a transceiver configured to communicate information with a server and a processor in communication with the transceiver. The processor may be configured to receive a file manifest from the server and transmit a list of to-be updated application file(s) based on the file manifest to the server. The processor may be further configured to receive one or more application files from the server based on the list. The processor may be further configured to flash one or more systems using the one or more application files based on at least one of destination file location, installation type, and file identification.

In at least one embodiment, a reprogramming management network includes a transceiver configured to communicate with a wireless device, and a server in communication with the transceiver and a processor. The processor may be configured to recognize a vehicle computing system (VCS) via an identification requesting a connection. The processor may be further configured to transmit an application manifest to the VCS based on the identification. The processor may be further configured to receive a management criteria having a request for an application file and transmit the application file to the VCS based on the management criteria.

In at least one embodiment, a nomadic device includes one or more transceivers configured to communicate information with a vehicle computing system and a server and a processor in communication with the one or more transceivers. The processor may be configured to receive a file manifest from the server and transmit the file manifest to the vehicle computing system (VCS). The processor may be further configured to receive a list of to-be updated applications based on the file manifest from the VCS and transmit the list to the server. The processor may be further configured to receive one or more application files from the server and transmit one or more application files having at least one of a destination file location, an installation type, and file identification.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

A vehicle computing system may have several features, systems, and/or components that execute one or more application files to perform the designed task. A vehicle computing system may require a service technician to manage the update of the one or more application files during regularly schedule maintenance of the vehicle and/or if the system sets a diagnostic code. The updating of the one or more application files of the vehicle computing system may require that the entire application file be replaced at that time the update is engaged with the system.

The present disclosure provides a system and method that may implement a series of management instructions taken by the vehicle computing system to wirelessly update one or more application files. The management instructions may be stored at local memory of the vehicle computing system, stored at the user's nomadic device, and/or downloaded from a server. The user may interact with several systems in communication with the vehicle computing system such that the user may engage in the update one or more application files. The management instructions may have several commands including, but not limited to, a full or partial flash of a component, instructions when to flash, and/or what application file(s) to update. The vehicle computing system may notify the user of the management instructions allowing transparency to the user. For the remote update of one or more application files of the computing system in a vehicle is described herein, the management instructions can be realized as discussed below.

Figure 1:
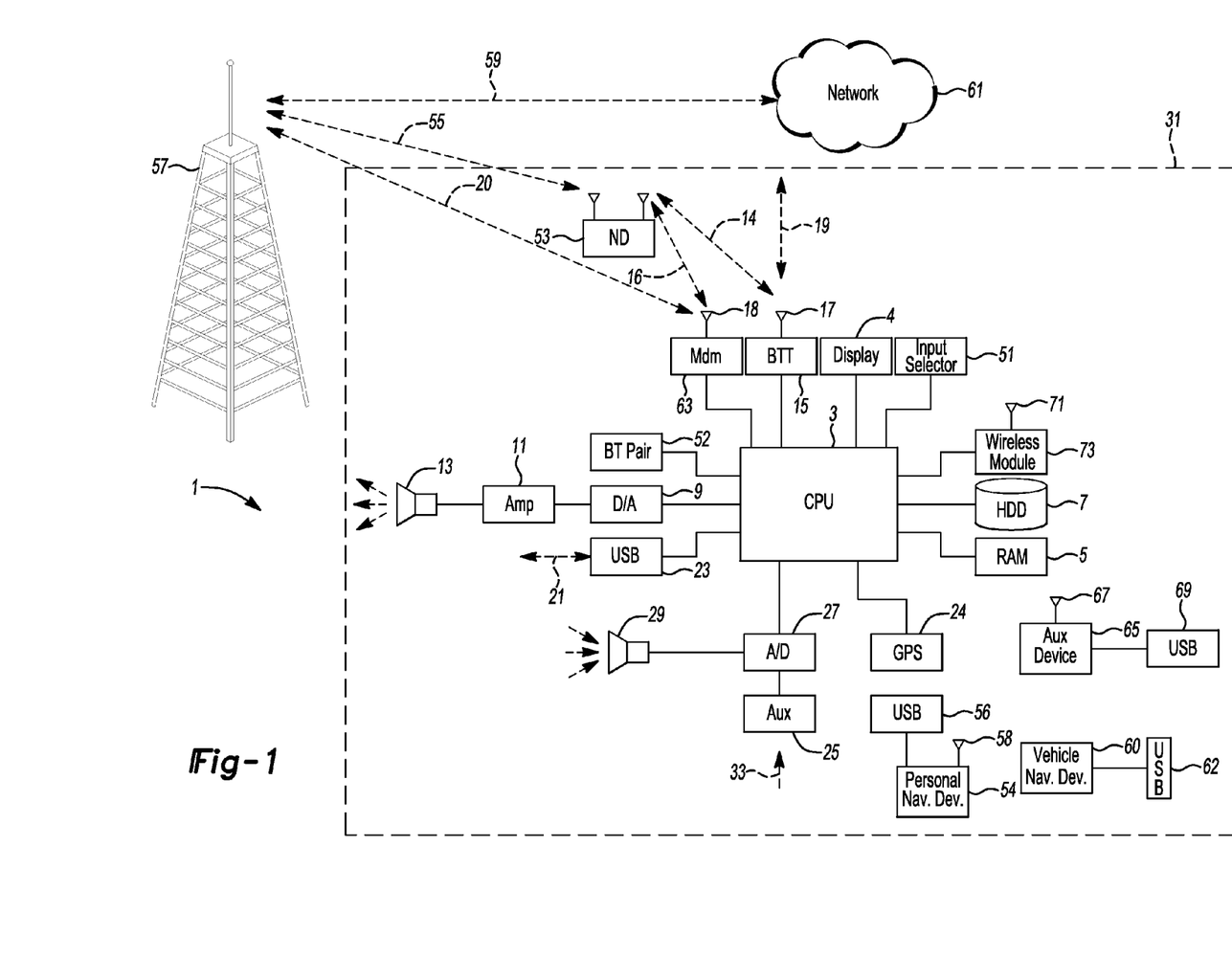
FIG. 1 is an exemplary block topology of a vehicle infotainment system implementing a user-interactive vehicle information display system according to an embodiment.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device 53 and the BLUETOOTH transceiver 15 is represented by signal 14.

Pairing a nomadic device 53 and the BLUETOOTH transceiver 15 can be instructed through a button 52 or similar input. Accordingly, the CPU 3 (i.e., processor) is instructed that the onboard BLUETOOTH transceiver 15 will be paired with a BLUETOOTH transceiver in a nomadic device 53.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device 53). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the nomadic device 53 includes a modem for voice band or broadband data communication. In the data-over-voice embodiment, a technique known as frequency division multiplexing may be implemented when the owner of the nomadic device 53 can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the nomadic device 53 may be a wireless local area network (LAN) device capable of communication over, for example (and without limitation), an 802.11g network (i.e., WiFi) or a WiMax network.

In one embodiment, incoming data can be passed through the nomadic device 53 via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU 3 could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU 3 could be connected to a vehicle based wireless router 73, using for example a WiFi (IEEE 803.11) 71 transceiver. This could allow the CPU 3 to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
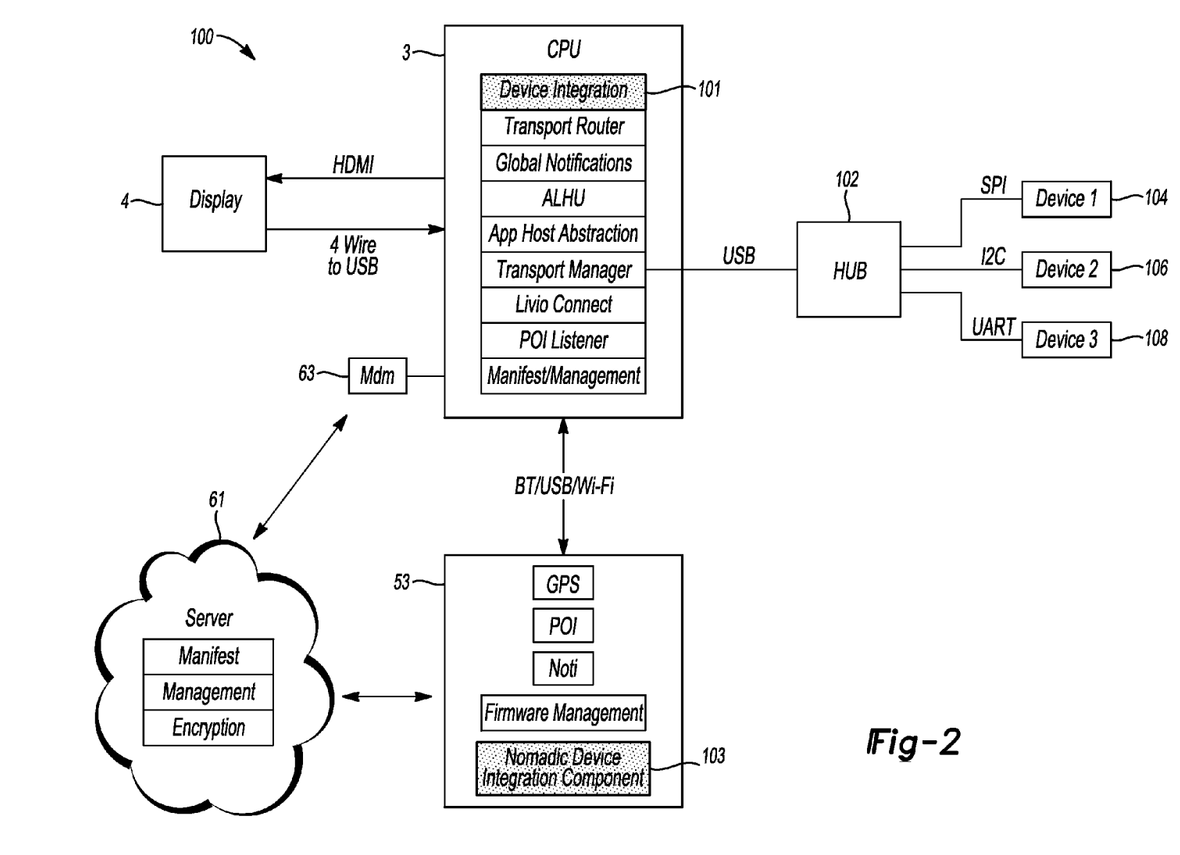
FIG. 2 is an exemplary block topology of a system for integrating one or more connected devices with a vehicle based computing system according to an embodiment.

FIG. 2 is an exemplary block topology of a system 100 for integrating one or more connected devices with the vehicle based computing system 1 (VCS) according to one embodiment. The CPU 3 (i.e., processor) may be in communication with one or more transceivers. The one or more transceivers are capable for wired and wireless communication for the integration of one or more devices. To facilitate the integration, the CPU 3 may include a device integration framework 101 configured to provide various services to the connected devices. These services may include transport routing of messages between the connected devices and the CPU 3, global notification services to allow connected devices to provide alerts to the user, application launch and management facilities to allow for unified access to applications executed by the CPU 3 and those executed by the connected devices, software/firmware manifest and download management, and point of interest location and management services for various possible vehicle 31 destinations.

As mentioned above, the CPU 3 of the VCS 1 may be configured to interface with one or more nomadic devices 53 of various types. The nomadic device 53 may further include a device integration client component 103 to allow the nomadic device 53 to take advantage of the services provided by the device integration framework 101. The nomadic device 53 integration component 103 may include, but is not limited to, a firmware management application executed on hardware provided within the nomadic device. The firmware management application may allow the nomadic device 53 to exchange firmware data between the VCS 1 and the server 61.

The one or more transceivers may include a multiport connector hub 102. The multiport connector hub 102 may be used to interface between the CPU 3 and additional types of connected devices other than the nomadic devices 53. The multiport connector hub 102 may communicate with the CPU 3 over various buses and protocols, such as via USB, and may further communicate with the connected devices using various other connection buses and protocols, such as Serial Peripheral Interface Bus (SPI), Inter-integrated circuit (I2C), and/or Universal Asynchronous Receiver/Transmitter (UART). The multiport connector hub 102 may further perform communication protocol translation and interworking services between the protocols used by the connected devices and the protocol used between the multiport connector hub 102 and the CPU 3. The connected devices may include, as some non-limiting examples, a radar detector 104, a global position receiver device 106, and a storage device 108.

The VCS 1 may receive at least a portion of data from one or more connected devices and format the at least a portion of data for output to one or more user interfaces. The one or more user interfaces may include, but is not limited to, a display 4 (e.g., touchscreen), speakers and/or an instrument cluster and gauges. In one example, the display may allow for user input using soft keys on the touchscreen, interaction with knobs and switches, and/or voice commands. The display configuration may include, but is not limited to, an HDMI (four-wire) connection between the CPU 3 and the touchscreen display 4.

The CPU 3 may include a software manager component that is used to track the one or more application files status of the VCS 1. The software manager component includes one or more management instruction algorithms executed on hardware within the CPU 3. The software manager component includes a manifest file that includes, but is not limited to, file identification, file status, installation type, and/or file location. The manifest file provides the software manager to track the status of an on-going transfer of one or more application files (e.g., firmware), find missing/incomplete file transfers, and/or track successful installation of one or more application files. The manifest file may also include rollback information such that the software manager tracks information to be able to rollback to a file that was an incomplete transfer or unsuccessfully downloaded.

The software manager component may manage a system level component that has access to update any portion of the file system of the VCS 1. The system level component may include files that update application level firmware that provide output to a display 4. The software manager component may monitor the VCS 1 file system and can update portions of the system before they are downloaded from a remote device (e.g., a nomadic device 53, server 61, and/or a combination thereof). The software manager component may update system components that cannot be updated while the user is using the system, such as device drivers, new user interfaces, communication protocols, or other portions of the VCS 1.

The software management component may communicate with the nomadic device 53 and/or server 61. The server 61 may maintain a manifest that includes a list of files to be updated for a VCS 1. The manifest at the server 61 may include a file identifier, the destined file location, an installation type, and a checksum. Some examples of the manifest defining an installation type of one or more files may include an active type, kill type, reboot type, system command type, and/or an image type.

For example, if the manifest states that a certain file has an active type installation, the VCS 1 may manage the download of the file as an instant replacement of a single file on the system. If the manifest states that a certain file has a kill type installation the VCS 1 may manage the download of the file by disabling a running process, replacing the file, and restarting the process. If the manifest states that a file has a reboot type installation, this may notify the VCS 1 to manage the download of the file by installing a parallel copy of the file and replacing the original file when the system detects a reboot. The manifest may state that a file has a system command type installation that may allow the VCS 1 to manage the install via a system command (e.g., such as "yum" or "apt-get"). The manifest may state that a file has an image type installation; therefore the VCS may install a full system image.

The server 61 may receive a manifest file maintained by the CPU 3 to track the one or more files executed by the VCS 1. The VCS 1 manifest is different from the manifest file on the server 61 because it may contain information regarding current transfer and install status of the one or more application files being downloaded at the VCS 1. The VCS 1 maintained manifest may also include rollback information, such that the VCS 1 may track information to be able to rollback transfer if a download is incomplete or corrupted. For example, the VCS 1 may recognize that the one or more file downloads are incomplete and/or corrupt, therefore the system 100 may reference the VCS manifest to retrieve the previous file(s) based on the rollback information.

The server 61 may securely transmit packages and provide custom manifests based on a VCS dependency. The packages may include software and/or firmware used to flash one or more applications, drivers, components, and/or modules. The server 61 may include logic management based on at least the currently installed packages that may be listed on the VCS manifest. The server 61 logic management may retrieve one or more packages and assign installation types based on the VCS manifest.

A server 61 connection with the VCS 1 may be secured by a public certificate authority (e.g., transport layer security) to secure a transfer between package server and the proxy nomadic device 53 and/or embedded communication module (i.e., onboard modem 63). A private encryption key that is shared by the server 61 and the VCS 1 may be used to receive a package. The data travelling along the connection that contains package manifests and file (package) data.

In one example, a nomadic device 53 may be used to proxy data between the CPU 3 and the server 61. The CPU 3 may be connected to the internet through the nomadic device 53 and/or onboard modem 63 such that software packages and/or firmware updates are transmitted to the VCS 1. A private encryption key may be shared by the CPU 3 and the server 61 to ensure a secure transmission of data. The private encryption key may be a unique key assigned only to the CPU 3. In one example, the encryption key may be transmitted from the server 61, however the encryption process may be implemented with a number of different encryption techniques, including, but not limited to, a predetermined known key on each VCS 1, a shared private/public key combination, and/or an independent certificate authority.

The server 61 and/or nomadic device 53 may receive a handshake process that is able to accurately identify a unique CPU 3, including version information for the software and/or firmware currently installed at the VCS 1. The nomadic device 53 and/or server 61 may transmit an encrypted file data for the recognized VCS 1. The data transmitted to the VCS 1 may include additional information that isn't on the VCS 1 manifest. The nomadic device 53, onboard modem 63, and/or server 61 may transmit multiple files at a time.

In one example, a request may be sent to the nomadic device 53 for a specific portion of the file data (e.g., firmware data). This may be requested by the VCS 1 if the data was determined to be corrupted (via checksum), if data was dropped during the transfer, and/or if the transfer was interrupted at some point. The server 61 may transfer partial data of a package based on a request sent from the CPU 3. The nomadic device 53 may receive the partial data from the server 61 and transmit it to the CPU 3. The CPU 3 may manage the software and/or firmware updates by monitoring the transfer/install status to track the status of an on-going transfer, find missing/incomplete transfers, track successful install.

Figure 3:
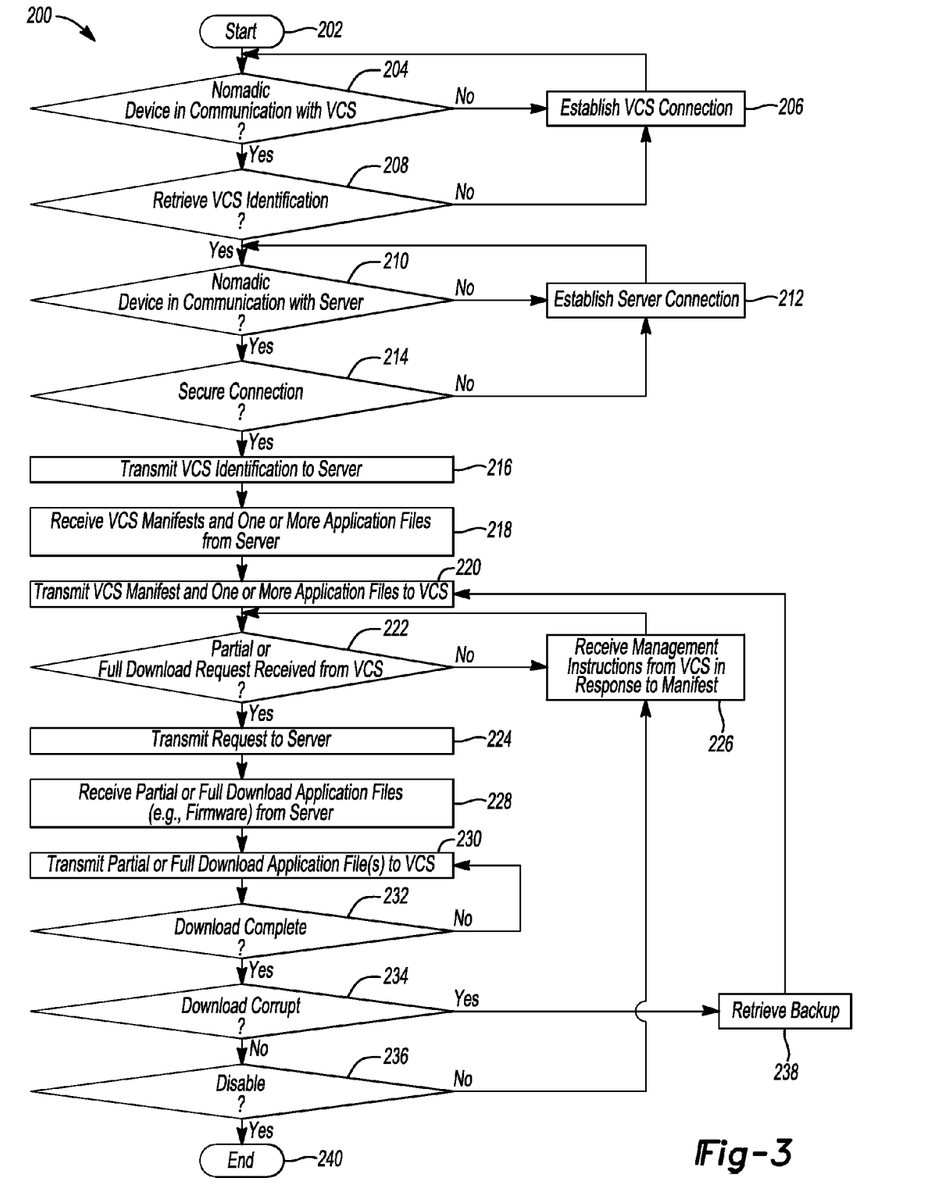
FIG. 3 is a flow chart illustrating a nomadic device communicating at least one of software and firmware data between the vehicle computing system and a server according to an embodiment.

FIG. 3 is a flow chart illustrating a nomadic device 53 communicating at least one of software and firmware data between the vehicle computing system 1 and a server 61 according to an embodiment. The nomadic device 53 may be a wireless mobile device communicating with the VCS 1 using short range wireless technology or may be an embedded communication module (e.g., onboard modem) within the VCS 1. The embedded communication module within the VCS 1 may include, but is not limited to, an embedded cellular module, WiFi module, or combination thereof. The method 300 may be implemented using software code contained and executed using hardware within the VCS 1, nomadic device 53, and the server 61. In other embodiments, the method 200 may be implemented in one or more CPUs 3 in the VCS 1, or distributed amongst multiple controllers (e.g., one or more processors) in communication with the nomadic device 53.

Referring again to FIG. 3, the VCS 1 and its components illustrated in FIG. 1, and FIG. 2 are referenced throughout the discussion of the method 200 to facilitate understanding of various aspects of the present disclosure. The method 200 of managing software and/or firmware downloads to the vehicle computing system such that it may automatically flash at least one of a device, application, driver, and/or module based on a manifest. The method 200 of managing a data package download to the VCS 1 may be implemented through a computer algorithm, machine executable code, or software instructions programmed into a suitable programmable logic device(s) of the vehicle, such as the vehicle control module, the device control module, another controller in communication with the vehicle computing system, or a combination thereof. Although the various operations shown in the flowchart diagram 200 appear to occur in a chronological sequence, at least some of the operations may occur in a different order, and some operations may be performed concurrently or not at all.

In operation 202, the nomadic device 53 may be enabled by a power-on request received from one or more mechanisms including, but not limited to, a power on button. The powering up of the nomadic device 53 may include the initialization of one or more applications executed on at least one control module embedded in the nomadic device 53. The one or more applications may include the device integration client component 103 to allow the nomadic device 53 to take advantage of the services provided by the device integration framework 101 of the vehicle CPU 3. The nomadic device 53 may search for and/or recognize a VCS 1 communication request in operation 204.

In operation 208, once the nomadic device 53 has established communication with the VCS 1, the device may retrieve the VCS identification and current version management file. If the nomadic device 53 is unable to establish a connection and/or retrieve the VCS identification and current version management file, the device may attempt to re-establish communication with the VCS 1 in operation 206.

In operation 210, the nomadic device 53 may search for and/or recognize a connection to establish communication with a server 61. For example, the nomadic device 53 may retrieve the VCS identification and current version management file, and in response to the established communication, search for a server to begin the management of an application file download. Once the nomadic device 53 has recognized a connection with the server 61, the nomadic device 53 may recognize if the communication is a secure connection in operation 214. The secure connection may include, but is not limited to, a cryptographic protocol. If the nomadic device 53 is unable to establish a connection and/or a secure connection with the server 61, the device may attempt to re-establish communication with the server 61 in operation 212.

In operation 216, the nomadic device 53 may transmit the VCS identification and current version management file to the server 61. Based on the VCS identification and current version management file, the nomadic device 53 may receive a VCS manifest and one or more application files from the server in operation 218. For example, the server receives the VCS current version management file and compares it to a database having the current version information for these one or more application files to determine dependencies and what files have updates available. The one or more application files may include, but is not limited to, software packs, firmware, and/or a combination thereof. The VCS manifest may include, but is not limited to, a list of application files to be updated at the VCS 1, the destined file location, an installation type, application file identifier, and/or a checksum.

In operation 220, the nomadic device 53 may transmit the VCS manifest and one or more application files to the VCS 1. In response to the VCS manifest and/or the one or more application files, the nomadic device 53 may receive a partial or full download request from the VCS of the one or more application files in operation 222. The nomadic device 53 may receive management instructions from the VCS in response to the manifest and/or based on a download request for the one or more application files in operation 226.

For example, the VCS manifest may include a notice of a new version of firmware for a driver configured with the VCS 1. The new version of firmware may not be included with the one or more application files; therefore the nomadic device may receive management instructions to retrieve the additional file(s) from the server 61. Once the nomadic device receives the additional file(s) form the server, it may transmit them to the VCS based on a partial or full download request. In another example, the management instructions received form the VCS 1 may include, but is not limited to, an image request to buffer the previous software executed in the VCS 1 before flashing the VCS 1 with a new version of software.

In operation 224, the nomadic device 53 may transmit the partial or full download request to the server 61. The nomadic device 53 may receive the partial or full download application files from the server 61 in operation 228. The nomadic device 53 may transmit a partial or full download of the application files to the VCS 1 in operation 230. The partial or full download may be managed based on one or more instructions received by the VCS 1.

In operation 232, the nomadic device 53 may receive a message from the VCS 1 indicating when the download is complete. The nomadic device 53 may receive a message form the VCS 1 indicating if the one or more application files transmitted to the VCS 1 are corrupt in operation 234. If the nomadic device 53 receives an application file corrupt message from the VCS 1, the nomadic device 53 may retrieve the backup and transmit it with the one or more application files to the VCS 1 in operation 238. The nomadic device 53 may proceed to follow the steps of enabling a download of the retrieved backup application file based on the corrupt message.

In another embodiment, the VCS may determine that the one or more application files received from the nomadic device are corrupt. The VCS may mitigate a remedial action based on the corrupted file. The remedial action taken by the VCS may include, but is not limited to, at least one of removing the detected corrupted file, retrieving the backup known good file, and re-flashing with the backup known "good" file.

In operation 236, the nomadic device 53 may receive a message indicating that the VCS 1 is no longer in communication with the device. The nomadic device 53 may disable the communication with the server based on the non-communication with the VCS 1 in operation 240.

Figure 4:
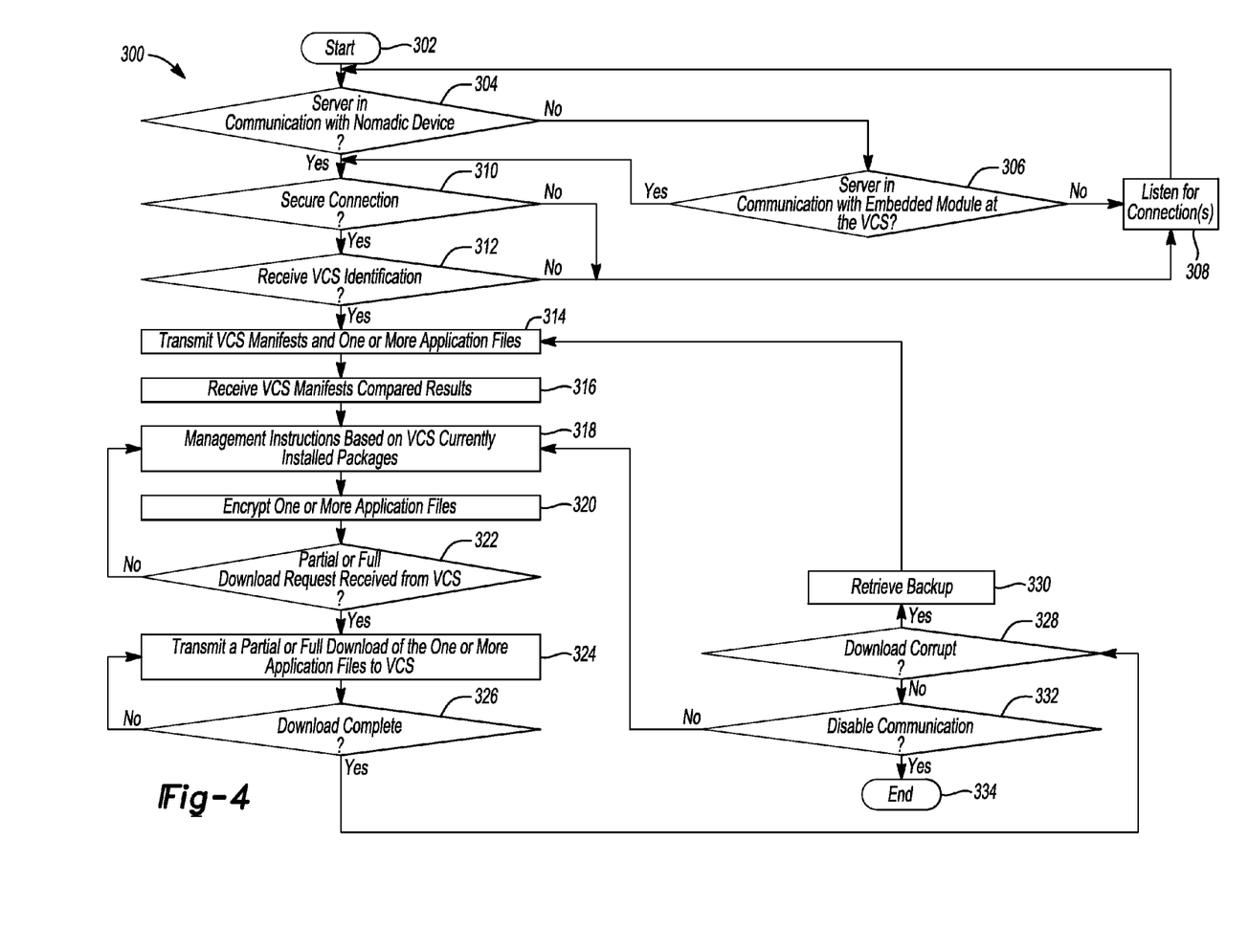
FIG. 4 is a flow chart illustrating a network managing a software and firmware manifest and transmitting install packages to a vehicle computing system according to an embodiment.

FIG. 4 is a flow chart illustrating a network (i.e., a server) managing a manifest and transmitting install packages to a vehicle computing system according to an embodiment. The method 300 of managing installation packages to the VCS 1 such that it may transmit one or more application files to the vehicle for updating/flashing at least one of a device, application, driver, and/or module based on a comparison between the server manifest and the VCS manifest. The server is capable of securely serving install packages to a VCS 1 and providing a custom manifest based on the VCS 1 dependencies. The VCS 1 dependencies may include, but is not limited to, features, functions, driver, applications, and/or other software components executed on the hardware within the system. The server 61 may be in communication with one or more databases that may be associated with the original equipment manufacturer of the vehicle configured with the VCS 1. The one or more databases may also include, but is not limited to, application databases that may be associated with features and functions implemented and executed in a vehicle using at least one of the VCS 1, nomadic device 53, and/or a combination thereof.

In operation 302, the server 61 may enable one or more algorithms executed on hardware at the server 61 to manage a secure communication of one or more application files to the VCS 1. The server 61 may recognize a communication connection with the nomadic device 53 in operation 304. The server 61 may communicate directly with the VCS 1 by establishing a connection with an embedded communication module (i.e., onboard modem 63) in operation 306. If the server 61 is unable to establish a connection with the VCS 1 using a nomadic device 53 and/or an embedded communication module, the server 61 may listen for a connection, therefore passively accepting connections, not actively trying to create them in operation 308.

In operation 310, the server 61 may be configured to establish a secure connection using one or more methods including, but not limited to, an encryption key that is shared by the server 61 and the VCS 1 such that the installation packages may be securely transmitted.

In operation 312, the server 61 may receive VCS 1 identification so that the server 61 may retrieve the appropriate manifest and/or application files related to that system. The server 61 may transmit the VCS manifest and one or more application files to the VCS 1 in operation 314. The server 61 may receive an updated VCS manifest based on the comparison of the server manifest with the manifest maintained by the VCS 1 in operation 316.

In another embodiment, the server may transmit a manifest to the VCS based on a recognized identification associated with the system. The server may receive from the VCS a list of current software version information running on the system. The server may do a comparison between the manifest and the list of current software version information, and transmit the new one or more application files to the VCS based on available file updates.

In operation 318, the server 61 may manage the download of the one or more application files being transferred to the VCS 1. The server 61 may manage the download of the one or more application files based on at least one of destination file location, installation type, and file identification. For example, the server 61 may provide additional download instructions to the VCS 1 based on the destination file location assigned to a safety critical subsystem. If the destination file location is the safety critical subsystem location, the server 61 may require the download and/or flash of the one or more files to be performed at a key-on or key-off event.

In operation 320, the server 61 may encrypt the one or more application files for a particular transfer to the VCS 1. In response to the received VCS manifest compared results and/or a request from the VCS 1, the server 61 may determine whether a partial or full download of the one or more application files may be transmitted to the VCS 1 in operation 322.

In operation 324, the server 61 may transmit a partial or full download of the one or more application files to the VCS 1. The server 61 may continuously transmit packets of data until the download is complete in operation 326. For example, the server 61 may receive a message from the VCS 1 indicating when the download is complete.

In operation 328, the server 61 may receive a message form the VCS 1 indicating if the one or more application files transmitted to the VCS 1 are corrupt. If the server 61 receives an application file corrupt message from the VCS 1, the server 61 may retrieve the original application file and transmit it to the VCS 1 in operation 330. The sever 61 may proceed to follow the steps of enabling a download of the retrieved backup application file based on the corrupt message.

In operation 332, the server 61 may receive a message indicating that the VCS 1 is no longer in communication. The server 61 may disable the communication with the VCS 1 based on the non-communication with the VCS 1 in operation 334.

Figure 5:
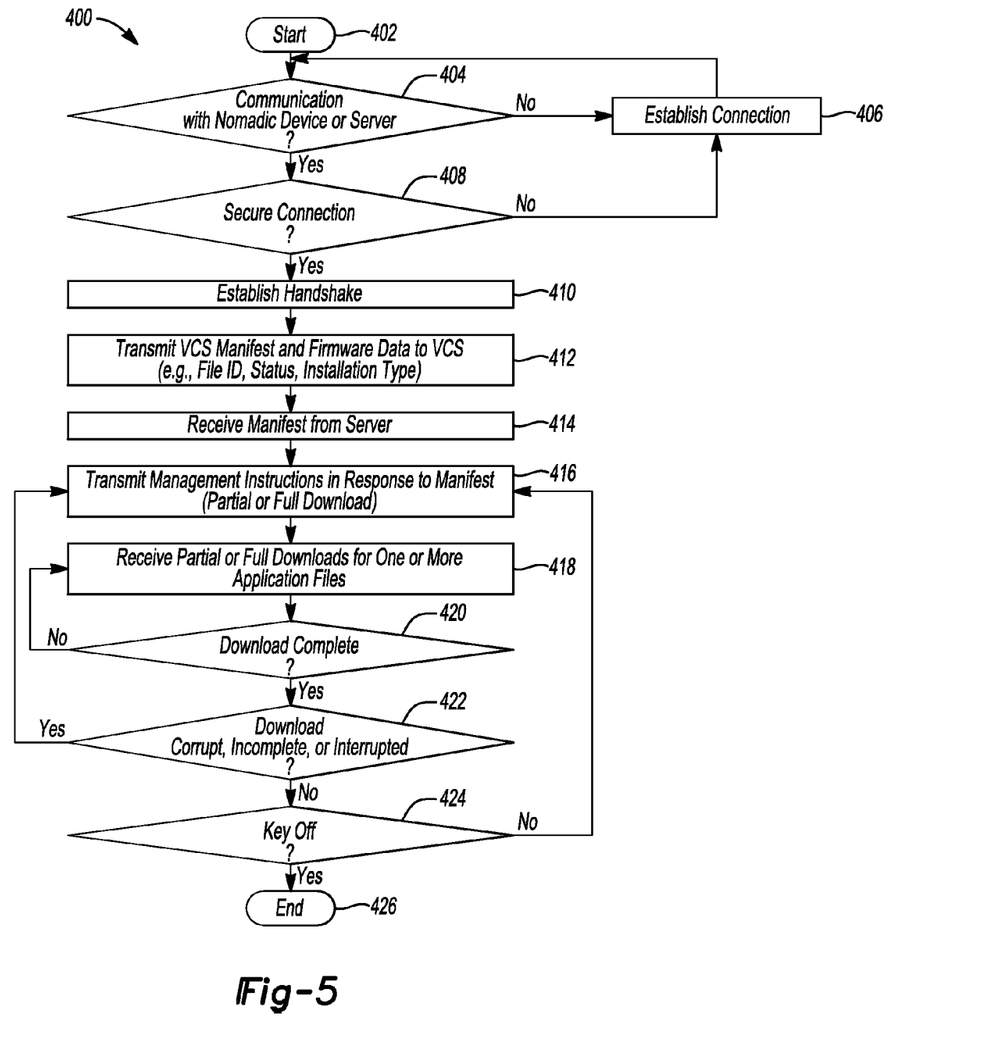
FIG. 5 is a flow chart illustrating a vehicle computing system managing at least one of software and firmware updates.

FIG. 5 is a flow chart 400 illustrating a vehicle computing system managing at least one of software and firmware updates. The VCS 1 may manage a system-level component that has access to update any portion of one or more application files executed on hardware within the VCS 1. The VCS 1 may include an application-level user interface which may provide the user control and information of the one or more application files. The user control and information regarding the one or more application files may include, but is not limited to, a downloading command and updating information. For example, the application-level user interface may provide a user with prompts, status, and/or feedback based on the update management of the one or more application files.

The system-level component may manage the entire VCS 1 file system such that it may update portions of the VCS 1 application file(s) before they are executed. The system-level component may manage the update of one or more application files for a component that cannot be updated while the user is using the system. For example, device drivers, new user interfaces, communication protocols, and/or other portions of the VCS 1 operating system may not be updated during operation, therefore the system-level component may manage when the one or more application files may be download.

In operation 402, during a key-on event which allows the vehicle to be powered on, the VCS 1 may begin powering up the one or more modules. The powering up of the one or more modules may initiate the system-level component to manage the one or more application files that may have been received by the server from the previous connection. The system-level component may allow one or more application files to be uploaded/flashed during the boot of the VCS 1 during the key-on event.

In operation 404, the VCS 1 may recognize a communication connection with the server using a nomadic device 53 or an embedded communication module. If the VCS 1 is unable to establish a connection with the server and/or nomadic device, the VCS 1 may transmit another request in an attempt to establish a connection in operation 406.

In operation 408, once a connection with the server 61 has been established, the VCS 1 may determine if the connection is secured by a public certificate authority (e.g., transport layer security) to ensure the communication of data maintains integrity and is confidential. If the VCS 1 determines that the connection is not a secure connection, the VCS 1 may disconnect communication with the server 61 and attempt to reestablish a connection in operation 406.

In operation 410, the VCS 1, using the nomadic device 53 and/or embedded communication module, may proceed to perform a handshake process with the server 61. The handshake process may include, but is not limited to, the transmission of the VCS identification, the one or more application files currently installed in the VCS 1, and the version information of the one or more application files as shown in operation 412.

In operation 414, the VCS 1 may receive a manifest from the server 61 that may include, but is not limited to, a list of one or more application files to be updated at the VCS 1. The manifest may include a file identifier, file location, installation type and a checksum based on the one or more application files to be updated at the VCS 1. In response to the received manifest from the server, the system-level component of the VCS 1 may transmit management instructions requesting a specific portion of the one or more applications files in operation 416.

For example, the system-level component of the VCS 1 may determine that the one or more application files includes an "active" installation type file, therefore, the VCS 1 may instantly replace the file on the system. In another example, the system-level component of the VCS 1 may determine that the one or more application files includes a "reboot" installation type file, therefore the VCS 1 may install a parallel copy of the file, and replace the original when the system reboots.

In operation 418, the VCS 1 may receive partial and/or full downloads for one or more application files based on the management instructions. The system-level component may manage the download of the one or more application files, and monitor if additional portions of the one or more applications files are needed in operation 420. The system-level component may request that the one or more application files be flashed to the respective component during download or stored in memory for a later update of the component based on the installation type.

For example, the VCS 1 may maintain the manifest to track the status of the download of one or more application files. The manifest maintained at the VCS 1 by the system-level component may include, but is not limited to, current transfer of the on-going down of an application file, install status of an application file, and/or missing or incomplete transfers of an application file. Based on the monitoring and management of the download of one or more application files, the VCS 1 may cause the system to update the manifest that tracks the status of the software and/or firmware versions running on the system.

In operation 422, the system-level component may determine if the one or more files being downloaded at the VCS 1 are corrupt via a checksum, incomplete flash, and/or the download transfer was interrupted. The system-level component may update the manifest based on a discovered issue and transmit management instructions to the server 61 for correction as shown in operation 416.

In operation 424, if the system detects a key-off event, the system may end the one or more algorithms used to manage the one or more application files used to update the VCS 1. The vehicle computing system may have a vehicle key-off mode to allow the system to store one or more application files, and/or portions of application file(s) in nonvolatile memory such that these file(s) may be uploaded by the system for the next key-on event in operation 426.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
   a vehicle processor, in communication with a transceiver, programmed to:
   receive, from a server, a file manifest listing application files to be installed and installation types specifying, for each file, whether instant replacement, process kill, reboot, system command, or reimage type installation is required to install the corresponding file; and
   install application files received from the server to memory locations in the vehicle according to the types specified by the manifest.

2. The system of claim 1, wherein the vehicle processer is further configured to communicate with the server using a nomadic device in communication with the transceiver.

3. The system of claim 1, wherein the vehicle processer is further configured to communicate with the server using an embedded modem in communication with the transceiver.

4. The system of claim 1, wherein the application file is at least one of software and firmware.

5. The system of claim 1, wherein the memory location is at least one of a driver, device, or control module identified by a destination file location included within the manifest.

6. The system of claim 5, wherein the destination file location is an instruction that is executed by the vehicle processor to flash a memory location for an identified component.

7. The system of claim 1, wherein the reboot type installation includes an instruction that is executed by the vehicle processor to store a copy of the application file for applying to the memory location during a reboot.

8. The system of claim 1, wherein the vehicle processer is further configured to receive a download corruption message based on the install of the memory location for one or more systems, and attempt a second install of the one or more systems using the application file.

9. A network comprising:
a server, in communication with a vehicle computing system (VCS) via a transceiver, configured to:
recognize a VCS request to communicate based on an identification received via the transceiver;
generate an application manifest based on the identification of the VCS, the manifest listing application files to be installed to the VCS and installation types specifying, for each file, whether instant replacement, process kill, reboot, system command, or reimage type installation is required to install the corresponding file;
transmit the application manifest to the VCS;
receive management criteria having a request for an application file; and
transmit the application file to the VCS based on the management criteria.

10. The network of claim 9, wherein the management criteria is a command for at least one of a partial or full transmission of the application file.

11. The network of claim 9, wherein the application manifest includes at least one of destination file location, installation type, and file identification.

12. The network of claim 9, wherein the server is further configured to receive a corruption message from the VCS and update the application manifest based on the corruption message.

13. The network of claim 9, wherein the transceiver is configured to communicate with at least one of a nomadic device in communication with the VCS and an embedded communication module in communication with the VCS.

14. The network of claim 9, wherein the identification is at least one of an assigned identification for the VCS, a list of currently installed application files at the VCS, and version information of the list of currently installed application files.

15. A nomadic device comprising:
one or more transceivers configured to communicate information with a vehicle computing system and a server;
a processor in communication with the one or more transceivers, the processor configured to:
receive a file manifest from the server, the file manifest listing application files to be installed to a vehicle computing system (VCS) and installation types specifying, for each file, whether instant replacement, process kill, reboot, system command, or reimage type installation is required to install the corresponding file;
transmit the file manifest to the vehicle computing system (VCS);
receive a list of one or more to-be-updated application files based on the file manifest from the VCS and transmit the list to the server;
receive one or more application files from the server; and
transmit one or more application files having at least one of a destination file location, an installation type, and a file identification.

16. The nomadic device of claim 15, wherein the file manifest is a list of one or more applications based on a recognized VCS.

17. The nomadic device of claim 15, wherein the installation type of the one or more applications files includes at least one of an active command, kill command, reboot command, image command, and system command.

18. The nomadic device of claim 17, wherein the active command is an instruction that is executed by the VCS to flash one or more memory locations in the vehicle with the one or more application files upon arrival.

19. The nomadic device of claim 15, wherein the list of one or more to-be-updated application files includes a request for one or more application files and a command for at least one of a partial or full transmission request of the one or more application files.

* * * * *